US009262997B2

(12) United States Patent
Hamada et al.

(10) Patent No.: US 9,262,997 B2
(45) Date of Patent: Feb. 16, 2016

(54) IMAGE DISPLAY APPARATUS

(71) Applicant: DENSO CORPORATION, Kariya, Aichi-pref. (JP)

(72) Inventors: Koji Hamada, Nisshin (JP); Isao Aichi, Toyota (JP)

(73) Assignee: DENSO CORPORATION, Kariya (JP)

( * ) Notice: Subject to any disclaimer, the term of this patent is extended or adjusted under 35 U.S.C. 154(b) by 271 days.

(21) Appl. No.: 13/892,575

(22) Filed: May 13, 2013

(65) Prior Publication Data

US 2013/0314314 A1    Nov. 28, 2013

(30) Foreign Application Priority Data

May 22, 2012 (JP) ................................ 2012-116630

(51) Int. Cl.
    *G09G 5/14*    (2006.01)
    *G06F 3/14*    (2006.01)
    *G06F 3/041*    (2006.01)
    *G09G 3/36*    (2006.01)

(52) U.S. Cl.
CPC ................ *G09G 5/14* (2013.01); *G06F 3/0418* (2013.01); *G06F 3/1423* (2013.01); *G09G 3/36* (2013.01); *G09G 2320/028* (2013.01); *G09G 2340/12* (2013.01); *G09G 2354/00* (2013.01); *G09G 2380/10* (2013.01)

(58) Field of Classification Search
None
See application file for complete search history.

(56) References Cited

U.S. PATENT DOCUMENTS

| 7,397,463 | B1* | 7/2008 | Kishi et al. ................. 345/173 |
| 7,969,423 | B2* | 6/2011 | Kawabe ...................... 345/173 |
| 2003/0125873 | A1* | 7/2003 | Yamaguchi et al. .......... 701/211 |
| 2006/0066507 | A1* | 3/2006 | Yanagisawa ...................... 345/7 |
| 2006/0139234 | A1* | 6/2006 | Tanaka ............... H04N 13/0409 345/9 |
| 2006/0191177 | A1* | 8/2006 | Engel ..................... B60K 35/00 40/453 |
| 2007/0291172 | A1* | 12/2007 | Kouzimoto et al. .......... 348/488 |
| 2007/0297064 | A1* | 12/2007 | Watanabe et al. ............. 359/630 |
| 2008/0053233 | A1* | 3/2008 | Sugiura ............................ 73/628 |
| 2008/0068284 | A1* | 3/2008 | Watanabe et al. .............. 345/1.1 |
| 2008/0106515 | A1 | 5/2008 | Shibata |

(Continued)

FOREIGN PATENT DOCUMENTS

| JP | 2004-262363 A | 9/2004 |
| JP | 2005-055822 A | 3/2005 |

(Continued)

OTHER PUBLICATIONS

Office Action mailed Apr. 15, 2014 in the corresponding JP application No. 2012-116630 (with English translation).

*Primary Examiner* — Amare Mengistu
*Assistant Examiner* — Crystal A Mathews
(74) *Attorney, Agent, or Firm* — Posz Law Group, PLC; David Posz

(57) ABSTRACT

An image display apparatus includes a liquid crystal panel with a dual-view function to display two different first and second screen-sized images that are visible in a driver-seat direction and a passenger-seat direction, respectively. The first screen-sized image in the driver-seat direction contains a guidance image and a guidance manipulation image; the second screen-sized image in the passenger-seat direction contains a video image and a video manipulation image. When an occupant in the driver seat manipulates an icon within the guidance manipulation image on the liquid crystal display panel, the same guidance manipulation image is also displayed in the passenger-seat direction by replacing the video manipulation image.

7 Claims, 6 Drawing Sheets

(56) References Cited

U.S. PATENT DOCUMENTS

| | | | |
|---|---|---|---|
| 2008/0129684 A1* | 6/2008 | Adams et al. | 345/156 |
| 2008/0133133 A1* | 6/2008 | Abels | 701/213 |
| 2008/0186282 A1* | 8/2008 | Nix et al. | 345/173 |
| 2009/0002268 A1* | 1/2009 | Ueta et al. | 345/7 |
| 2009/0013261 A1 | 1/2009 | Noda et al. | |
| 2009/0160732 A1* | 6/2009 | Kimura | 345/1.1 |
| 2009/0195659 A1* | 8/2009 | Nagata et al. | 348/207.1 |
| 2010/0073306 A1* | 3/2010 | Hickerson | 345/173 |
| 2010/0079413 A1* | 4/2010 | Kawashima et al. | 345/175 |
| 2010/0097525 A1* | 4/2010 | Mino | 348/564 |
| 2010/0328355 A1* | 12/2010 | Fukushima et al. | 345/690 |
| 2011/0121958 A1* | 5/2011 | Waller et al. | 340/438 |
| 2011/0227718 A1* | 9/2011 | Waller et al. | 340/461 |
| 2011/0310050 A1* | 12/2011 | Chiang | 345/174 |
| 2012/0274549 A1* | 11/2012 | Wehling et al. | 345/156 |

FOREIGN PATENT DOCUMENTS

| | | |
|---|---|---|
| JP | 2005-234676 A | 9/2005 |
| JP | 2005-284592 A | 10/2005 |
| JP | 2007-219097 A | 8/2007 |
| JP | 2008-003868 A | 1/2008 |
| JP | 2010-287032 A | 12/2010 |

* cited by examiner

IMAGE DISPLAY APPARATUS

CROSS REFERENCE TO RELATED APPLICATION

The present application is based on Japanese Patent Application No. 2012-116630 filed on May 22, 2012, the disclosure of which is incorporated herein by reference.

TECHNICAL FIELD

The present disclosure relates to an image display apparatus which displays a plurality of different images corresponding to a plurality of visual recognition directions, the different images being visible from the respective visual recognition directions.

BACKGROUND ART

[Patent Literature 1] JP 2005-284592 A

Patent Literature 1 describes an in-vehicle image display apparatus of dual-view type. The in-vehicle image display apparatus simultaneously displays, in the screen, a plurality of screen-sized images to be visible from a plurality of visual recognition directions, respectively. That is, a first screen-sized image containing a guidance image for navigation is visible from a driver seat or in a driver-seat direction, whereas a second screen-sized image containing a video image reproduced by a DVD player is visible from a front passenger seat or in a front-passenger-seat direction.

In addition, the in-vehicle image display apparatus displays a first manipulation image for the guidance image in the driver-seat direction and a second manipulation image for the video image in the front-passenger-seat direction. Each manipulation image contains a plurality of icons. To manipulate the icon, a touch panel is provided to be laminated on the screen of the in-vehicle image display apparatus.

However, the touch panel does not determine from which visual recognition direction an icon is manipulated. Therefore, the in-vehicle image display apparatus of Patent Literature 1 displays the icons for the guidance image to be located at positions on the screen as being separate from the positions on the screen of the icons for the video image.

In the image display apparatus of dual-view type, a first manipulation image is visible from a first visual recognition direction but invisible from a second visual recognition direction other than the first visual recognition direction. Even if the icons for the first visual recognition direction are displayed as being separate from the icons for the second visual recognition direction, as mentioned above, a person located in the second visual recognition direction does not understand which icon a person located in the first visual recognition direction manipulates. The person in the second visual recognition direction may touch the screen of the image display apparatus, possibly causing an erroneous manipulation.

In addition, the person in the second visual recognition direction may extend the hand to the image display apparatus during the manipulation by the person in the first visual recognition direction. In such a case, the person in the first visual recognition direction may have an erroneous recognition to suppose that the person in the second visual recognition direction cause an erroneous manipulation.

SUMMARY

It is an object of the present disclosure to provide an image display apparatus, which provides a prevention measure in a manipulation state where a first person in a first visual recognition direction performs a manipulation to a manipulation image. That is, under the manipulation state of the first person, a second person in a second visual recognition direction may be prevented from causing an erroneous manipulation while the first person in the first visual recognition direction may be prevented from having an erroneous recognition to suppose that the second person in the second visual recognition direction causes an erroneous manipulation.

To achieve the above object, according to an aspect of the present disclosure, an It is an object of the present disclosure to provide an image display apparatus as follows. A display portion is included which displays a plurality of images corresponding to a plurality of visual recognition directions, the images being visible from the respective visual recognition directions, the visual recognition directions including a first visual recognition direction and a second visual recognition direction. A manipulation reception portion is included which receives a manipulation via one of a plurality of manipulation images that are included in the images displayed by the display portion, the manipulation images being visible from the respective visual recognition directions, the manipulation images including a first manipulation image corresponding to the first visual recognition direction and a second manipulation image corresponding to the second visual recognition direction. An action detection portion is included which detects whether a manipulator, who is located in one of the visual recognition directions, takes an action to perform a manipulation to the manipulation reception portion. A control circuit is included which executes a control corresponding to a manipulation, which is performed by the manipulator to the manipulation reception portion via one of the manipulation images in the display portion. An erroneous recognition prevention section is included which controls the display portion to display the first manipulation image in the second visual recognition direction when the manipulation reception portion receives a subject manipulation via the first manipulation image by a subject manipulator, who is located in the first visual recognition direction, the subject manipulator being detected by the action detection portion as taking the action to perform the subject manipulation to the manipulation reception portion.

Under the above configuration, the first manipulation image is displayed in the second visual recognition direction by replacing the second manipulation image when the manipulator in the first visual recognition direction manipulates the first manipulation image in the first visual recognition direction. This can provide a caution to a person in the second visual recognition direction. The person in the second visual recognition direction may be prevented from touching the screen of the image display apparatus; thus, the person in the second visual recognition direction can be prevented from causing an erroneous manipulation, from a viewpoint of a person in the first visual recognition direction.

Further, the above caution to the person in the second visual recognition direction may prevent the person in the second visual recognition direction from extending a hand towards the image display apparatus; thus, the person in the first visual recognition direction may be prevented from having an erroneous recognition to suppose that the person in the second visual recognition direction causes an erroneous manipulation.

Further, as an optional aspect, the action detection portion may detect that a manipulator, who is located in one of the visual recognition directions, takes an action to perform a manipulation to the manipulation reception portion when the action detection portion detects that the manipulator moves a hand closer to a screen of the display portion or moves a hand into contact with the screen of the display portion.

Thus, only when the manipulator in the first visual recognition direction moves a hand closer to the display portion in order to perform a manipulation via the first manipulation image, the caution may be provided to the second visual recognition direction, without need to provide a special manipulation of preventing an erroneous manipulation or erroneous recognition from occurring.

BRIEF DESCRIPTION OF THE DRAWINGS

The above and other objects, features, and advantages of the present disclosure will become more apparent from the following detailed description made with reference to the accompanying drawings. In the drawings.

DETAILED DESCRIPTION

Figure 1:
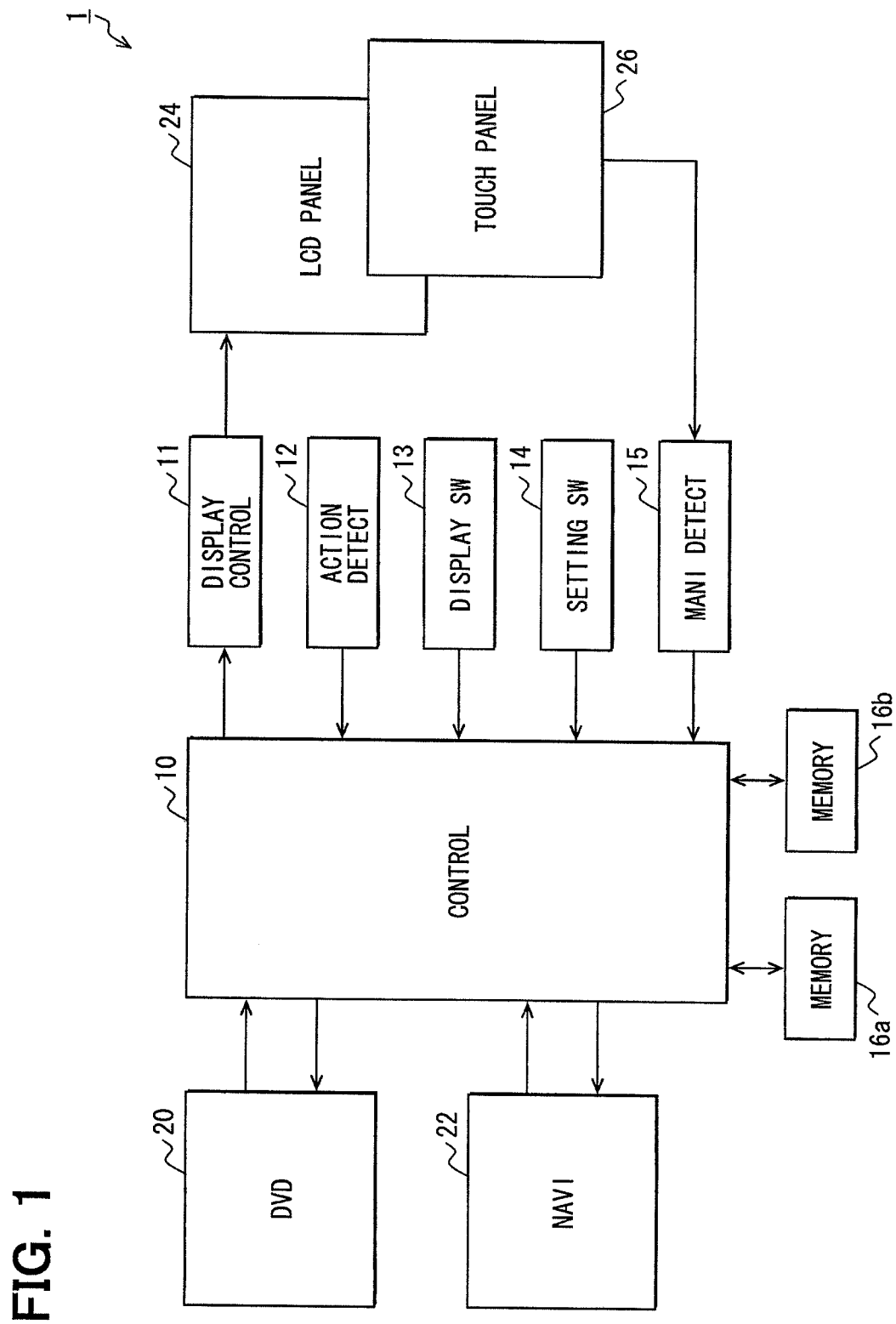
FIG. 1 is a block diagram showing a configuration of an image display apparatus according to an embodiment of the present disclosure.

Hereafter, description will be given to an embodiment of the present disclosure with reference to the drawings.

[Configuration]

An image display apparatus 1 according to an embodiment of the present disclosure is mounted in a subject vehicle and includes a central control circuit 10, a liquid crystal display controller 11, an action detection sensor 12, a display switchover switch 13, a display setting switch 14, a manipulation detection circuit 15, and memories 16a, 16b.

In addition, the image display apparatus 1 further includes a DVD apparatus 20, a navigation apparatus 22, a liquid crystal display panel 24, and a touch panel 26. The central control circuit 10 is a computer apparatus containing a CPU, ROM, and RAM (none shown); it executes various processes such as an erroneous recognition prevention process mentioned later. The central control circuit 10 communicates with the memories 16a and 16b about the information necessary for execution of the various processes, and performs writing and reading of the necessary information.

The liquid crystal display controller 11 is a control apparatus for image displays which displays various images on a screen of the liquid crystal display panel 24 based on (i) image information inputted via the central control circuit 10 from the DVD apparatus 20 or the navigation apparatus 22, or (ii) control information inputted from central control circuit 10 executing the various processes.

The action detection sensor 12 is a sensor which detects an action of an occupant or manipulator such as a driver A sitting on a driver seat and a front passenger B sitting on a front passenger seat. Hereinafter, the front passenger may be referred to as a passenger; the front passenger seat may be referred to as a passenger seat. The action detection sensor 12 is disposed at a position near a roof light which is installed in a front side of a compartment ceiling between the driver seat and the passenger seat. The sensing method by the action detection sensor 12 is known by such as KINECT (registered trademark); thus, the detailed explanation is not given.

The display switchover switch 13 is a switch to change to one of three settings of a driver seat side, a neutral, and a passenger seat side; it is a mechanical switch installed in a console panel (unshown) for requesting switchover of manipulation images displayed on the liquid crystal display panel 24. For example, when this switch 13 is set to the driver setting, the central control circuit 10 executes the control, which displays a driver-side manipulation image 32b not only in a driver-side direction (i.e., on a driver-seat side) but also in a passenger-side direction (i.e., on a passenger-seat side) on the liquid crystal display panel 24 (refer to FIG. 4). This will be explained later.

The display setting switch 14 is a mechanical switch (unshown) installed in a console panel for various settings about the display of the various images in the liquid crystal display panel 24. For instance, the display setting switch 14 is used for setting an approval (YES) or disapproval (NO) of a switchover process (refer to FIG. 4), which switches a passenger-side manipulation image 30b (refer to FIG. 2), which is displayed in the passenger-side direction, into the driver-side manipulation image 32b (refer to FIG. 4). The various kinds of settings performed using the display setting switch 14 will be explained as needed.

The manipulation detection circuit 15 is a circuit to calculate a coordinate of a position of a manipulation on the touch panel 26 based on a manipulation signal, which is inputted from the touch panel 26 when the manipulation is performed on the touch panel 26.

The DVD apparatus 20 is an apparatus which reads information, such as video recorded on a DVD. The DVD apparatus 20 outputs information to the central control circuit 10 based on control signals received from the central control circuit 10; the information includes image information of video read from a DVD.

The navigation apparatus 22 includes a reception apparatus (unshown) which receives signals for specifying a present position of the subject vehicle from GPS satellites. The navigation apparatus 22 is an apparatus which prepares guidance images for navigation (for example, an image of a map where a sign of a present position is superimposed) based on the information acquired from the reception apparatus. The navigation apparatus 22 outputs information to the central control circuit 10 based on control signals received from the central control circuit 10; the information includes image information such as route guidance image.

The liquid crystal display panel 24 is installed in the console panel (unshown); it is controlled by the central control circuit 10 or the liquid crystal display controller 11 to display the video read by the DVD apparatus 20 or the guidance image prepared by the navigation apparatus 22.

The liquid crystal display panel 24 is a liquid crystal panel with a dual-view function or mode to permit displaying a driver-side image visible from the driver-side direction (i.e., on the driver-seat side), and a passenger-side image visible from the passenger-side direction (i.e., on the passenger-seat side) at the same time; the driver-side image may be different from the passenger-side image. The touch panel 26 is a transparent panel laminated on the screen of the liquid crystal display panel 24. When a manipulator performs a manipulation on the touch panel 26 by touching a position on the touch panel 26, the touch panel 26 outputs a manipulation signal, which is used to calculate the position of the manipulation, to the manipulation detection circuit 15.

[Displayed Images]

Figure 2:
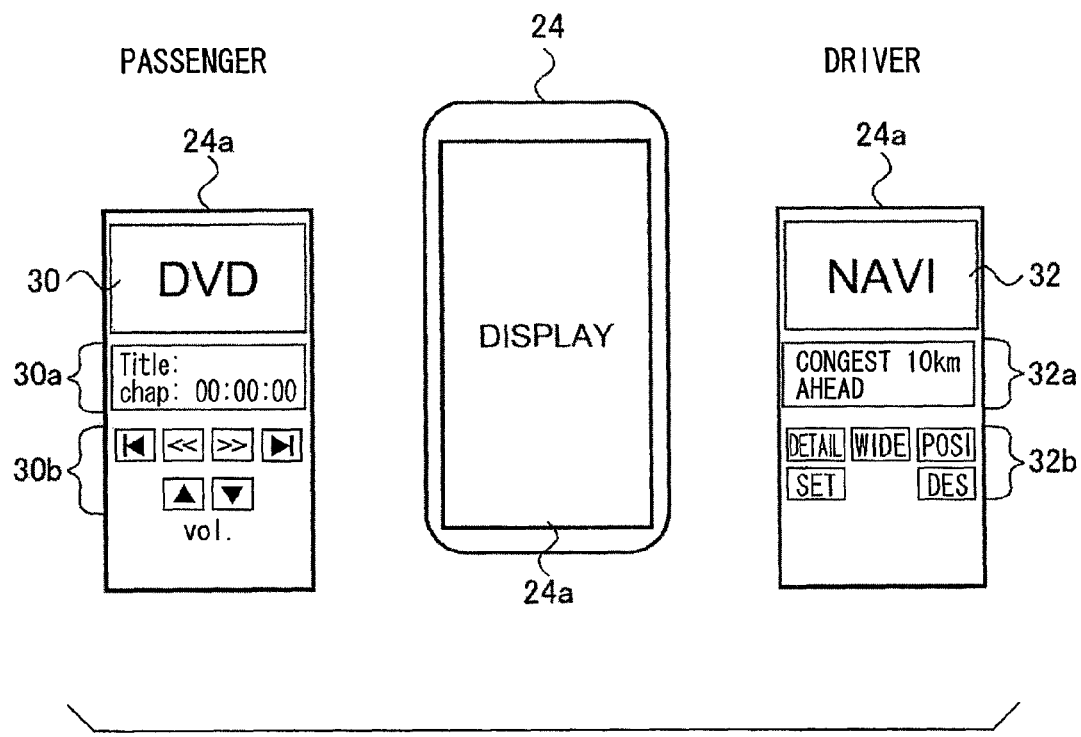
FIG. 2 is a diagram for explaining images displayed on a liquid crystal display panel.

The following will explain images displayed on the liquid crystal display panel 24 of the image display apparatus 1 with reference to FIG. 2.

As explained above, the image display apparatus 1 of the present embodiment includes the liquid crystal display panel 24 installed in the console panel (unshown). The liquid crystal display panel 24 displays a video image 30 and/or a guidance image 32, which are outputted from the DVD apparatus 20 and/or the navigation apparatus 22, on the screen 24a.

In addition, sub images 30a and 32a and manipulation images 30b and 32b are displayed on the liquid crystal display panel 24 as images associated with the video image 30 and the guidance image 32. The sub images 30a and 32a and the manipulation images 30b and 32b are displayed based on the image information stored in the central control circuit 10, and image information outputted from the DVD apparatus 20, and the navigation apparatus 22. The layout of the images is adjusted based on the control by the central control circuit 10 or the liquid crystal display controller 11.

The sub image 30a is displayed directly under the video image 30. The display content of the sub image 30a includes a title and a reproducing time of the video image 30; the images are displayed based on the information outputted from the DVD apparatus 20. The sub image 32a is also displayed directly under the guidance image 32. The display content of the sub image 32a includes information necessary for route guidance such as congestion information, which is displayed based on the information outputted from the navigation apparatus 22.

Further, the manipulation images 30b and 32b are displayed under the sub images 30a and 32a. The manipulation image 30b contains a plurality of icons, which indicate fast forward, rewinding, rewinding skip, and fast forward skip of the video image 30 and increase and decrease of the sound volume.

In addition, the manipulation image 32b contains a plurality of icons, which include present position designation, destination designation, map enlargement (wide area), map reduction (details), and settlement (setting) of each manipulation. According to the present embodiment, as illustrated in FIG. 2, the video image 30, the sub image 30a, and the manipulation image 30b are displayed to be visible in or from the passenger-side direction (i.e., on the passenger-seat side); the guidance image 32, the sub image 32a, and the manipulation image 32b are displayed to be visible in or from the driver-side direction (i.e., on the driver-seat side). In contrast, the guidance image 32, the sub image 32a, and the manipulation image 32b, which are displayed to be visible in the driver-side direction, is invisible (i.e., cannot be seen) from the passenger-side direction; the video image 30, the sub image 30a, and the manipulation image 30b, which are displayed to be visible in the passenger-side direction, is invisible (i.e., cannot be seen) from the driver-side direction.

Further, in other words, a passenger-side screen-sized image may be defined as containing the video image 30, the sub image 30a, and the manipulation image 30b and is displayed to be visible in or from the passenger-side direction (i.e., on the passenger-seat side); a driver-side screen-sized image may be defined as containing the guidance image 32, the sub image 32a, and the manipulation image 32b and is displayed to be visible in or from the driver-side direction (i.e., on the driver-seat side). In contrast, the passenger-side screen-sized image, which is displayed to be visible in the driver-side direction, is invisible (i.e., cannot be seen) from the passenger-side direction; the driver-side screen-sized image, which is displayed to be visible in the passenger-side direction, is invisible (i.e., cannot be seen) from the driver-side direction.

Further, in the present embodiment, when the touch panel 26 is manipulated, the manipulation detection circuit 15 inputs the information, which is about the coordinate of the manipulation position that is touched, to the central control circuit 10. When the manipulation position is a position that displays an icon included in the manipulation image 30b and 32b, the central control circuit 10 outputs a control signal, which is specified by the icon corresponding to the manipulation position, to the DVD apparatus 20 or the navigation apparatus 22.

To that end, under the present embodiment, when a manipulation image displayed on the liquid crystal display panel 24 is manipulated to receive a manipulation, the DVD apparatus 20 or the navigation apparatus 22 is operated to permit an image corresponding to the manipulation to appear or be displayed on the liquid crystal display panel 24.

For example, when the DVD apparatus 20 is operated, a reproduced image of video or a fast forward image may be displayed as the video image 30; when the navigation apparatus 22 is operated, an image of a map where a present position is superimposed, or an image indicating a destination may be displayed as the guidance image 32.

[Erroneous Recognition Prevention Process]

Figure 3:
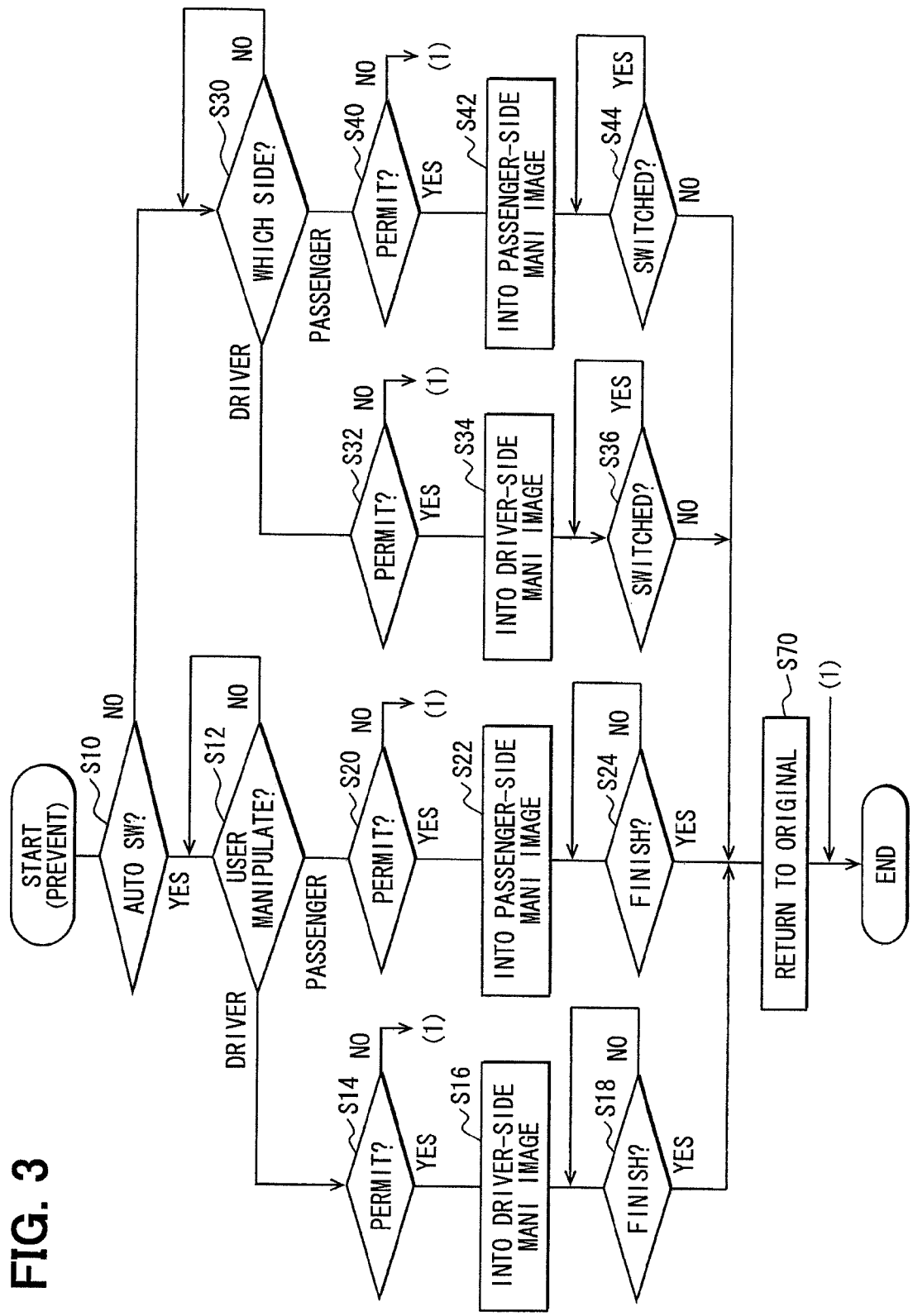
FIG. 3 is a flowchart diagram illustrating an erroneous recognition prevention process.

The following will explain an erroneous recognition prevention process executed by the central control circuit 10 with reference to FIG. 3.

The present erroneous recognition prevention process is executed while the guidance image 32 is displayed to be visible in the driver-side direction and the video image 30 is displayed to be visible in the passenger-side direction (refer to FIG. 2).

It is further noted that a flowchart in the present application includes sections (also referred to as steps), which are represented, for instance, as S10. Further, each section can be divided into several sections while several sections can be combined into a single section. Furthermore, each of thus configured sections can be referred to as a module, device, or means.

With a start of the process, S10 is executed first. At S10, it is determined whether an automatic switchover is selected for switching manipulation images, which are displayed in the driver-side direction or the passenger-side direction. The automatic switchover is started by detecting an action of a driver A or a front passenger B using the action detection sensor 12.

In detail, the above selection of the automatic switchover is previously made by manipulating or switching the display setting switch 14 between the automatic switchover and manual switchover; the determination is made based on the result of the selection. When it is determined that the automatic switchover is selected, it is determined that a present mode is a switchover mode (S10: YES). S12 thereby starts. When it is determined that the manual switchover is selected, it is determined that the present mode is not the switchover mode (S10: NO). S30 thereby starts.

At S12, it is determined whether a driver A or a front passenger B is performing a manipulation intention action from the movement of the driver A in the driver seat and the front passenger B in the passenger seat, whichever is detected using the manipulation detection sensor 12; the manipulation intention action is moving a hand closer to the liquid crystal display panel 24 or moving a hand into contact with the liquid crystal display panel 24.

When it is determined that neither the driver A nor the front passenger B is performing the manipulation intention action (S12: NO), a standby process starts. When it is determined that the driver A is performing the manipulation intention action (S12: DRIVER), S14 to S18 are executed. When it is determined that the front passenger B is performing the manipulation intention action (S12: PASSENGER), S20 to S24 are executed.

It is noted that even when it is determined at S10 that the automatic switchover is selected, whether to actually switch the manipulation images can be predetermined by manipulating the display setting switch 14. In other words, manipulating the display setting switch 14 permits the selection of whether the process at S16 and subsequent are actually executed to switch the manipulation images with respect to the passenger-side direction when the driver A is performing the manipulation intention action at S14. Similarly, manipulating the display setting switch 14 permits the selection of whether the process at S22 and subsequent are actually executed to switch the manipulation images with respect to the driver-side direction when the front passenger B is performing the manipulation intention action at S20. In detail, at S14, it is determined whether starting a process, which switches the sub image 30a and manipulation image 30b, is actually permitted or not.

When it is determined that switching of the manipulation image 30b or the like in the passenger-side direction is permitted (S14: YES), S16 is executed. When it is determined that it is not permitted (S14: NO), the present process ends and S16 is repeatedly executed.

Figure 4:
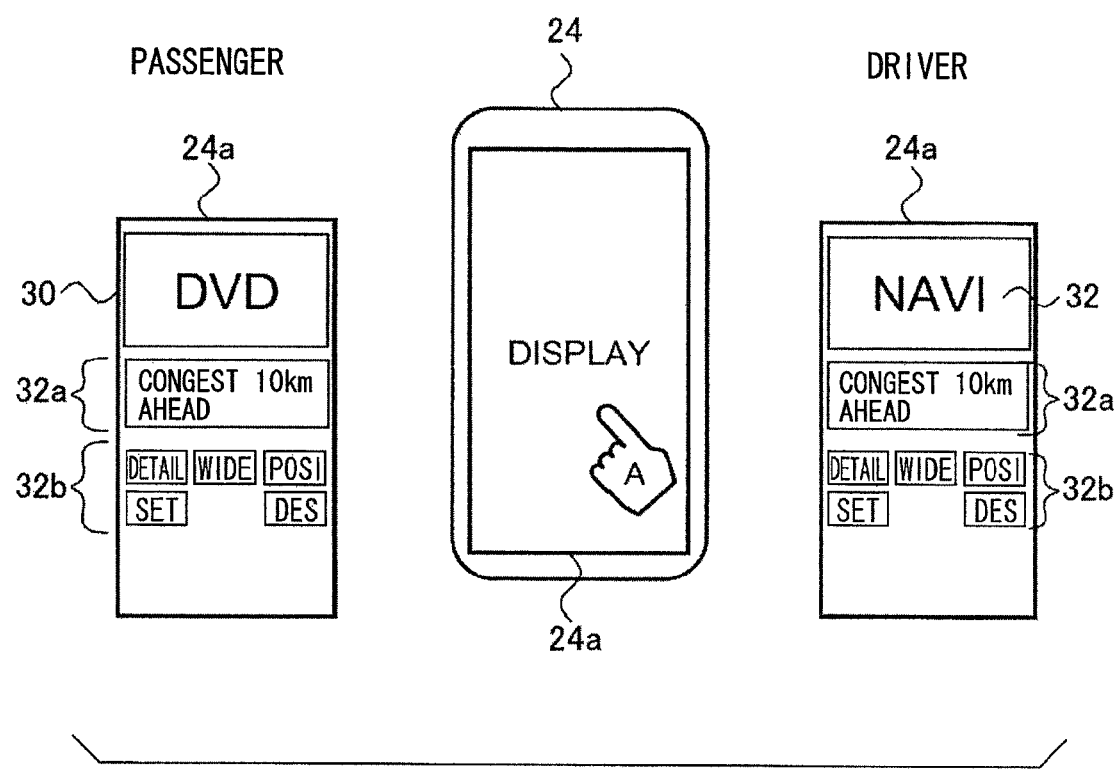
FIG. 4 is a diagram for explaining a state where a manipulation image displayed in a front-passenger-seat direction is switched into an image that is identical to a manipulation image displayed in a driver-seat direction.

At S16, the sub image 30a and the manipulation image 30b, which have been displayed in the passenger-side direction (refer to FIG. 2), are switched into the sub image 32a and the manipulation image 32b, which are currently displayed in the driver-side direction (refer to FIG. 4). Thereby, a caution may be provided for preventing the front passenger B from touching a part of the displayed manipulation image 32b or the like.

Figure 5:
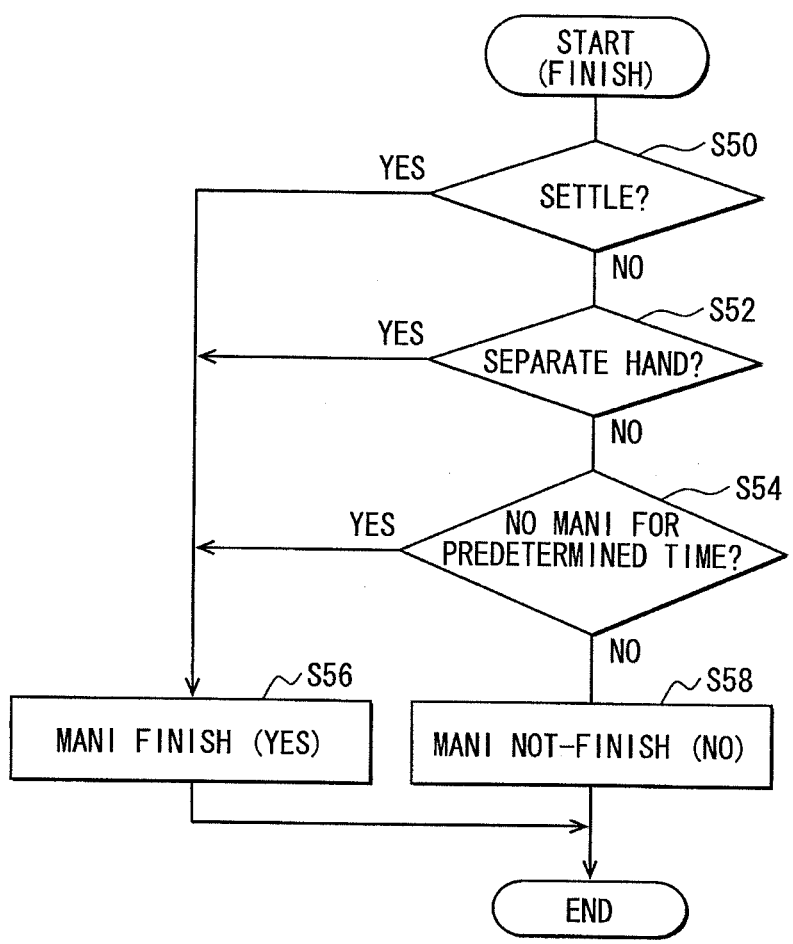
FIG. 5 is a flowchart diagram illustrating a finish process.

At S18, it is determined whether the driver A finishes the manipulation or not. In specific, the determination is made based on a flowchart of a finish process in FIG. 5. First, at S50, it is determined whether a settlement manipulation is made. When a specified action is made by the driver A for settling a manipulation, the manipulation detection sensor 12 may detect the specified action. This results in determining that the settlement manipulation is made.

When it is determined that the settlement manipulation is made (S50: YES), it is determined at S18 that the driver A finishes the manipulation (S56). In contrast, when it is determined that the settlement manipulation is not made (S50: NO), S52 is executed next.

At S52, it is determined whether the driver A performs a manipulation finish action to move or separate a hand farther from the liquid crystal display panel 24, using the manipulation detection sensor 12. When it is determined that the driver A moves a hand farther from the liquid crystal display panel 24 (S52: YES), S56 is executed. In contrast, when it is determined that the driver A does not move a hand farther from the liquid crystal display panel 24 (S52: NO), S54 is executed.

At S54, it is determined whether or not the driver A performs no manipulation using the manipulation image 32b for a predetermined time period or duration (for example, 3 minutes). The determination at S54 is affirmed when no signal, which indicates that the touch panel 26 is manipulated, is transmitted for the predetermined time period. When it is determined that the driver A performs no manipulation (S54: YES), S56 is executed. When it is determined that the driver A performs a manipulation (S54: NO), it is determined at S18 that the driver A does not finish the manipulation (S58).

It is noted that at S50, S52, the determination is made for the person whoever is determined to be performing a manipulation intention action. That is, at S18, only the action of the driver A is determined, whereas at S18, any action of the front passenger B is not determined.

Then, the flow returns to the erroneous recognition prevention process in FIG. 3. When it is determined that the driver A finishes the manipulation (S18: YES), S70 is then executed. In contrast, when it is determined that the driver A does not finish the manipulation (S18: NO), a standby process is executed.

At S70, the sub image 32a and the manipulation image 32b, which were substituted at S16, are switched into the original sub image 30a and the manipulation image 30b. S10 is then executed again.

The following will explain the process from S20 to S24 and S70 is explained. The process of S20 to S24 is executed when it is determined at S12 that the front passenger B in the front passenger-side direction is performing a manipulation intention action to move a hand closer to or move a hand into contact with the liquid crystal display panel 24 (S12: PASSENGER).

The process of S20 to S24 is different from the process of S14 to S18 in that it is for the front passenger B in the passenger-side direction (i.e., on the passenger-seat side), instead of for the driver A in the driver-side direction (i.e., on the driver-seat side); therefore, detailed explanation is omitted.

The following will explain the case where it is determined at S10 that that the manual switchover is selected (S10: NO), namely, it is determined that the present mode is not a switchover mode. When it is determined that the present mode is not a switchover mode (S10: NO), S30 is executed.

At S30, it is determined whether the display switchover switch 13 is manipulated into the driver seat side or the passenger seat side. When it is determined that the display switchover switch 13 is manipulated to the driver seat side (S30: DRIVER), S32 to S36 are executed. When it is determined that the display switchover switch 13 is manipulated into the passenger seat side (S30: PASSENGER), S40 to S44 are executed. When it is determined that the display switchover switch 13 is not manipulated to either the driver seat side or the passenger seat side (S30: NO), a standby process is executed.

At S32, similarly to S14, it is determined whether actually starting a process, which switches or replaces the sub image 30a and manipulation image 30b, is permitted or not. When it is determined that switching of the manipulation image 30b or the like in the passenger seat side is permitted (S32: YES), S34 is executed. When it is determined that it is not permitted (S32: NO), the present process is ended and S10 is repeatedly executed.

At S34, similar to S16, the sub image 30a and the manipulation image 30b, which have been displayed in the passenger-side direction, are switched into the sub image 32a and the manipulation image 32b, which are currently displayed in the driver-side direction. Thereby, a caution may be provided for preventing the front passenger B from touching a part of the displayed manipulation image 32b or the like.

At S36, it is determined whether the display switchover switch 13 is manipulated to the driver seat side or other than the driver seat side. When it is determined that the display switchover switch 13 is still manipulated to the driver seat side instead of other than the driver seat side (S36: YES), a standby process is executed. When it is determined that the display switchover switch 13 is manipulated to other than the driver seat side (S36: NO), S70 is executed. At S70, the sub image 32a and the manipulation image 32b, which were substituted at S34, are switched into the original sub image 30a and the manipulation image 30b.

After S70, S10 is again executed. The following will explain the process of S40 to S44. The process of S40 to S44 is executed when it is determined at S30 that the display switchover switch 13 is manipulated into the passenger seat side (S30: PASSENGER).

The process of S40 to S44 is different from the process of S32 to S44 in that the sub image and the manipulation image in the driver-side direction are switched, instead of switching those in the passenger-side direction; the detailed explanation is omitted.

[Effect]

The present embodiment executes the erroneous recognition prevention process (FIG. 3), thereby providing the following. When receiving a manipulation using the manipulation image 32b for the guidance image 32 displayed in the driver-side direction (S12: DRIVER), the image display apparatus 1 displays the same manipulation image 32b for the guidance image 32 in the passenger-side direction, thereby providing a caution, as indicated in FIG. 4.

Therefore, the caution performed by the image display apparatus 1 according to the present embodiment prevents the front passenger B sitting in the front passenger seat from touching the screen of the liquid crystal display panel 24 during the manipulation of the driver A. This also prevents the front passenger B sitting in the front passenger seat from executing an erroneous manipulation from a viewpoint of the driver A.

Further, the caution performed by the image display apparatus 1 according to the present embodiment prevents the front passenger B sitting in the front passenger seat from moving a hand closer to or moving a hand into contact with the liquid crystal display panel 24. This can prevent the driver A from having an erroneous recognition to suppose that the front passenger B on the front passenger side causes an erroneous manipulation.

According to the present embodiment, as illustrated in FIG. 4, when a person whose hand approaches or touches the liquid crystal display panel 24 is the driver A, the process starts which displays the manipulation image 32b in the passenger-side direction to be visible from the front passenger seat side (S12 to S16).

Therefore, without any need of providing a specific manipulation for preventing the occurrence of an erroneous manipulation or erroneous recognition mentioned above, only when the driver A moves a hand closer to or moves a hand into contact with the liquid crystal display panel 24, a caution or attention-seeking may be provided to the front passenger seat side.

Further, as explained above, the manipulation image 30b, which has been displayed in the passenger-side direction, is switched into or replaced by the manipulation image 32b, which is the same as that currently displayed in the driver-side direction, when the driver A moves a hand closer to or moves a hand into contact with the liquid crystal display panel 24. Even in such a case, when the driver A performs a manipulation finish manipulation to move a hand away or farther from the liquid crystal display panel 24 (S52), the original manipulation image 30b is again displayed in the passenger-side direction (S70).

Therefore, even when, in the passenger-side screen-sized image, the manipulation image 30b for the front passenger seat side is switched into or replaced by the manipulation image 32b for the driver seat side (S16), the manipulation image 30b for the front passenger seat side can be returned (S70) only by the driver A moving a hand farther or separating a hand from the liquid crystal display panel 24 (S52).

Further, in the present embodiment, when there is no manipulation to the touch panel 26 using the manipulation image 32b in the driver-side direction for a predetermined time period (S54) since the manipulation image 30b for the front passenger seat side is switched into the manipulation image 32b for the driver seat side, the display in the passenger-side direction is returned to an original display (i.e., the manipulation image 30b) (S70). In addition, when the settlement manipulation to settle a series of manipulations using the manipulation image 32b is made (S50) after the manipulation image 30b for the passenger seat side is switched into the manipulation image 32b for the driver seat side (S16), the display for the passenger seat side is returned to an original display (i.e., the manipulation image 30b) (S70).

This configuration can reduce minimally the time period for which the manipulation using the manipulation image 30b is disabled from the passenger seat side. In addition, the determination as to whether the present mode is a switchover mode (S10) permits the determination as to whether the process (S12 and subsequent) about the automatic switchover of the manipulation images is executed or not. When a user feels the automatic switchover complicate or troublesome, the automatic switchover can be stopped by changing the setting of the switchover mode.

In addition, in the present embodiment, even when the automatic switchover is enabled, the automatic switchover may be disabled with respect to only either the driver seat side or the passenger seat side (S14, S20, S32, S40). This responds to the case where the driver A may feel the automatic switchover troublesome when the automatic switchover is performed during driving, for example.

Other Embodiments

In the present embodiment, the action detection sensor 12 is disposed at a position near a roof light which is installed in a front side of a compartment ceiling between the driver seat and the front passenger seat. Without need to be limited thereto, another installation position may be adopted. For example, it may be installed near a roof light in a center of the compartment ceiling, or in the instrument panel or the console panel.

In the present embodiment, the display switchover switch 13 and the display setting switch 14 are mechanical switches disposed in the console panel. They may be virtual switches formed as icons on the liquid crystal display panel 24. In such a case, the touch panel 26 may detect a manipulation to the switches, for example.

Figure 6:
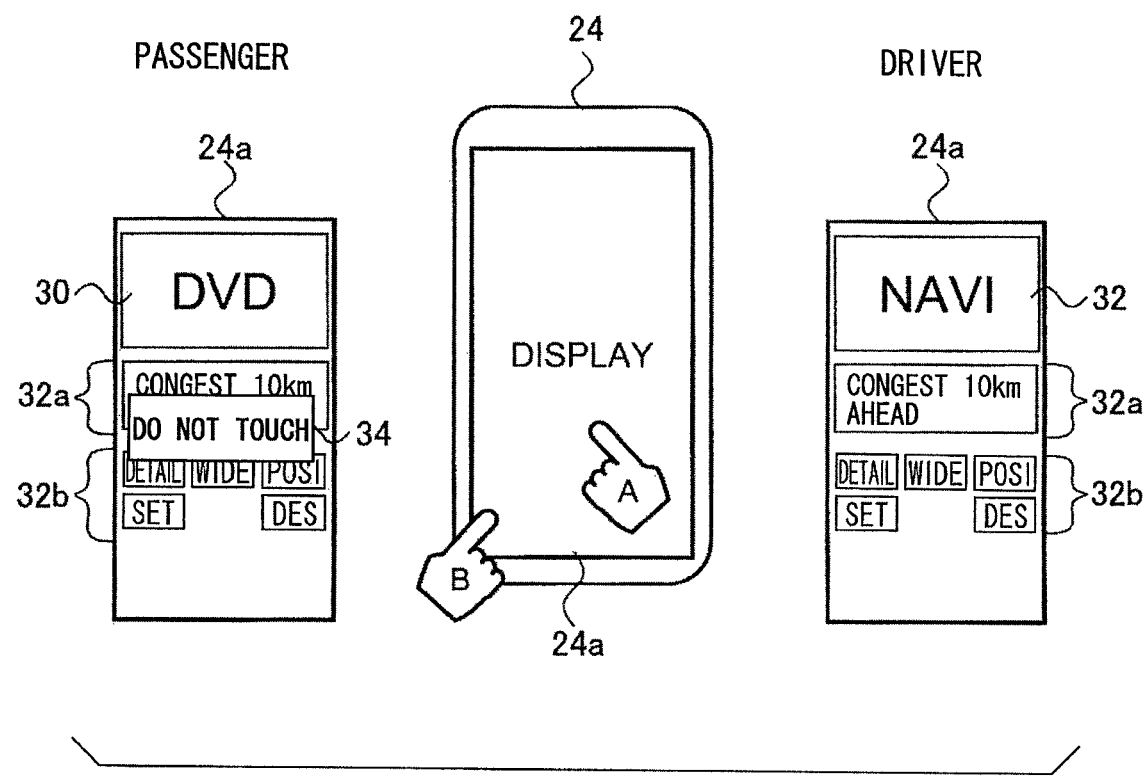
FIG. 6 is a diagram for explaining another state where a manipulation image displayed in a front-passenger-seat direction is switched into an image that is identical to a manipulation image displayed in a driver-seat direction.

In the present embodiment, at the process of S16, S22, S34, and S42, the sub image and manipulation image in the driver-side direction or in the passenger-side direction are switched. In addition to switching the sub image and the manipulation image, as indicated in FIG. 6, a notice image 34, which indicates that any manipulation is forbidden (e.g., "DO NOT TOUCH"), may be superimposed on the sub image and the manipulation image, which have been substituted.

In the present embodiment, the erroneous recognition prevention process is applied to the case where two different images (the video image and the guidance image) are displayed in the driver-side direction and in the passenger-side direction, respectively. Without need to limited thereto, it may be applied to the case where the same image is displayed in both the driver-side direction and the passenger-side direction, or the case where one image is displayed in only either the driver-side direction or the passenger-side direction.

In addition, in the present embodiment, S12 considers a manipulation intention action by the driver A or the front passenger B of moving a hand closer to the liquid crystal display panel 24 or moving a hand into contact with the liquid crystal display panel 24. In this case, when there is an action by a hand of the driver A or the front passenger B of moving closer to the liquid crystal display panel, it may be determined that there is an action of moving a hand closer to the liquid crystal display panel 24. Further, when a hand of the driver A or the front passenger B enters a range of a predetermined distance from the liquid crystal display panel 24, it may be determined that there is an action of moving a hand closer to the liquid crystal display panel 24. Further, when a hand of the driver A or the front passenger B touches the screen of the liquid crystal display panel 24, it may be determined that the driver A or. the front passenger B moves a hand into contact with the liquid crystal display panel 24.

In addition, in the present embodiment, S52 considers an action by the driver A or the front passenger B of moving a hand farther from the liquid crystal display panel 24. In this case, when there is an action by a hand of the driver A or the front passenger B of moving away from the liquid crystal display panel or when this action continues for a predetermined time, it may be determined that there is an action of moving a hand farther from the liquid crystal display panel 24. Further, when, of the driver A or the front passenger B, a hand, which was in a range of a predetermined distance from the liquid crystal display panel 24, exits from the range, it may be determined that there is an action of moving a hand farther from the liquid crystal display panel 24.

(Correspondence Relation)

The liquid crystal display panel 24 may be also referred to as a display portion, device, or means. The touch panel 26 and the manipulation detection circuit 15 may be referred to as a manipulation reception portion, device, or means. The action detection sensor 12 may be referred to as an action detection portion, device, or means. The central control circuit 10 may be referred to as a control circuit, portion, device, or means.

Further, one of the driver-side direction (i.e., the driver seat side) and the passenger-side direction (i.e., the passenger seat side) may be referred to as a first visual recognition direction; the other may be referred to as a second visual recognition direction.

One of the manipulation image 30b displayed in the driver-side direction and the manipulation image 32b displayed in the passenger-side direction may be referred to as a first manipulation image; the other may be referred to as a second manipulation image.

S12 to S70 in FIG. 3 executed by the central control circuit 10 may be referred to as an erroneous recognition prevention section, device, or means.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. An image display apparatus comprising:
a display portion which displays a plurality of screen-sized images corresponding to a plurality of visual recognition directions in a screen,
the screen-sized images being visible from the respective visual recognition directions, the visual recognition directions including a first visual recognition direction and a second visual recognition direction,
each of the screen-sized images containing (i) a manipulation image and (ii) a manipulated image to be manipulated via the manipulation image;
a manipulation reception portion which receives a manipulation via one of the manipulation images that are included in the screen-sized images displayed by the display portion, the manipulation images being visible from the respective visual recognition directions,
the manipulation images including a first manipulation image corresponding to the first visual recognition direction and a second manipulation image corresponding to the second visual recognition direction,
the manipulated images including a first manipulated image that is manipulated via the first manipulation image and a second manipulated image that is manipulated via the second manipulation image;
an action detection portion that detects whether a manipulator, who is located in one of the visual recognition directions, takes an action to perform a manipulation to the manipulation reception portion;
a control circuit that which executes a control corresponding to a manipulation performed by the manipulator to the manipulation reception portion via one of the manipulation images in the display portion; and
an erroneous recognition prevention section, wherein:
a subject manipulation is performed by a subject manipulator via the first manipulation image displayed in the first visual recognition direction, the subject manipulator being located in the first visual recognition direction and detected by the action detection portion as taking the action to perform the subject manipulation to the manipulation reception portion; and
when the subject manipulation is received by the manipulation reception portion, the erroneous recognition prevention section controls the display portion to display the second manipulated image and the first manipulation image in the second visual recognition direction by replacing the second manipulation image, having been displayed in the second visual recognition direction before the subject manipulation is received, with an image identical to the first manipulation image currently displayed in the first visual recognition direction.

2. The image display apparatus according to claim 1, wherein:
the erroneous recognition prevention section controls the display portion to start displaying the first manipulation image in the second visual recognition direction when the action detection portion detects a subject action by the subject manipulator located in the first visual recognition direction as the taken action to perform the subject manipulation to the manipulation reception portion, the subject action being one of (i) moving a hand of the subject manipulator closer to a screen of the display portion and (ii) moving a hand of the subject manipulator into contact with the screen of the display portion.

3. The image display apparatus according to claim 1, wherein:

when the action detection portion detects an action by the subject manipulator located in the first visual recognition direction of moving a hand farther from a screen of the display portion in a state where the first manipulation image is displayed in the second visual recognition direction, the erroneous recognition prevention section controls the display portion to finish displaying the first manipulation image in the second visual recognition direction.

4. The image display apparatus according to claim 3, wherein:

when the erroneous recognition prevention section controls the display portion to finish displaying the first manipulation image in the second visual recognition direction, the erroneous recognition prevention section controls the display portion to display the second manipulation image in the second visual recognition direction by replacing the first manipulation image.

5. The image display apparatus according to claim 1, wherein:

when the manipulation reception portion does not receive a manipulation for a predetermined duration in a state where the first manipulation image is displayed in the second visual recognition direction, the erroneous recognition prevention section controls the display portion to finish displaying the first manipulation image in the second visual recognition direction.

6. The image display apparatus according to claim 1, wherein:

when a settlement manipulation, which settles a series of manipulations via the first manipulation image, is received in a state where the first manipulation image is displayed in the second visual recognition direction, the erroneous recognition prevention section controls the display portion to finish displaying the first manipulation image in the second visual recognition direction.

7. The image display apparatus according to claim 1, wherein:

in a state where the first manipulation image is displayed in the second visual recognition direction, the erroneous recognition prevention section further controls the display portion to display a notice image in the second visual recognition direction, the notice image indicating prohibition of a manipulation to the manipulation reception portion.

* * * * *